July 4, 1961 B. SABEN 2,990,637
MIRROR-MOUNTED AUXILIARY OBJECT HOLDER
Filed May 11, 1959

INVENTOR.
BENJAMIN SABEN

United States Patent Office 2,990,637
Patented July 4, 1961

2,990,637
MIRROR-MOUNTED AUXILIARY OBJECT HOLDER
Benjamin Saben, San Gabriel, Calif., assignor of one-tenth to Gadget-Of-The-Month Club, Inc., North Hollywood, Calif., a corporation of California
Filed May 11, 1959, Ser. No. 812,315
2 Claims. (Cl. 40—10)

The present invention consists of an attachment bracket and holder, which is adapted to be removably attached vertically either above or below a conventional automobile rear vision mirror, and also consists of an attachment bracket and holder of the type just described in combination with a conventional automobile rear vision mirror; said attachment bracket and holder including a flat thin-sheet main body member, usually of substantially rectangular configuration, provided with a central strip-like portion displaced from the plane of the remainder of the main body member and providing, together with the adjacent portion of the main body member, a mirror edge-engageable hook means adapted to receive and engage a central portion of one edge of a substantially rectangular, transversely longitudinal, automobile rear vision mirror having substantially straight top and bottom edges. Furthermore, said main body member includes a plurality of forwardly projecting engaging elements spaced around the edges thereof adapted to removably receive and hold a plurality of superimposed substantially rectangular elements, usually including a light attenuating mirror shield, a multi-sheet memo pad, and, at the front, a graphic safe-driving pictorial display member which may bear the pictorial representation of a motorcycle officer and/or suitable safe-driving slogans thereon in order to warn a driver of a vehicle carrying the automobile rear vision mirror and the device of the present invention to drive safely, courteously, lawfully, and within the speed limit.

Furthermore, the device is provided with two auxiliary hooks interconnected by an elastic longitudinal tensile member adapted to be centrally hooked over and engaged between said mirror edge-engageable hook means and adjacent portions of said main body member, with each of said auxiliary hooks being adapted to be symmetrically spacedly engaged with the opposite edge of the automobile rear vision mirror whereby to effectively and resiliently mount the main body member closely vertically adjacent to the automobile rear vision mirror and, in one preferred form, additionally providing between the back surface of the automobile rear vision mirror and adjacent portions of said elastic longitudinal tensile member, retaining means for resiliently removably mounting and retaining a writing instrument, such as a pencil or a pen.

Furthermore, it should be noted that, in a preferred form of the invention, said main body portion is provided with an edge adapted to overlap the vertically adjacent edge of the automobile rear vision mirror when said hook means is engaged with said edge, and is adapted to thereby provide, together with the oppositely positioned auxiliary hooks, shield-holding means for removably holding and positioning the above-mentioned light attenuating shield in front of the automobile rear vision mirror to minimize the reflected glare of headlights of an automobile following the automobile carrying said automobile rear vision mirror and the attachment bracket and holder of the present invention.

It is an object of the present invention to provide a device of the character generally described above, which is adapted to be effectively removably mounted either above or below a conventional automobile rear vision mirror, and which is of extremely simple, cheap, foolproof construction such as to be conducive to widespread use of the device.

Further objects will be apparent to persons skilled in the art after a careful study hereof.

For the purpose of clarifying the nature of the present invention, two exemplary embodiments are illustrated in the hereinbelow-described figures of the accompanying single sheet of drawings, and are described in detail hereinafter.

Figure 1:
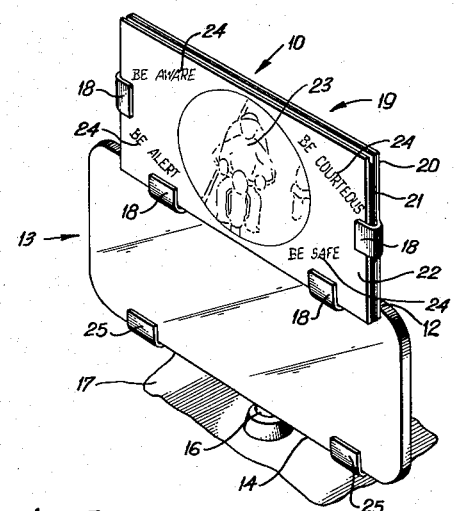
FIG. 1 is a reduced-size perspective view of one exemplary form of the invention shown in its normal top mounted position with respect to a conventional automobile rear vision mirror of the type having a mounting arm pivotally connected to a portion of an automobile below the level of the mirror.
Figure 2:
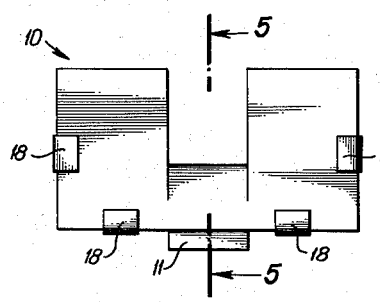
FIG. 2 is a front view of the main body member only of the attachment bracket and holder of FIG. 1 as seen from the front thereof and with all of the plurality of superimposed substantially rectangular elements adapted to be carried thereby removed from the plurality of forwardly projecting engaging elements for purposes of drawing clarity and simplicity.

In the specific embodiment of the invention illustrated in FIGS. 1–5, the above-mentioned main body member takes one specific form, as indicated generally at 10, wherein it is formed of flat thin-sheet metal and is of substantially rectangular configuration and is provided with a central rectangular strip displaced downwardly from the plane of the remainder of the main body member 10 so as to effectively provide, together with the adjacent portion of the main body member 10, an effectively downwardly open, downwardly directed, mirror edge-engageable hook means 11 adapted to hook over and engage a central portion of the top edge 12 of an automobile rear vision mirror, indicated generally at 13, which is of the substantially rectangular transversely longitudinal type having a substantially straight top edge 12 and a substantially straight bottom edge 14 parallel to the top edge 12 and with suitable fastening means 15 being attached to the back surface of the mirror 13 and being adapted to be controllably adjustably pivotally mounted, as indicated at 16, with respect to a fragmentary portion, indicated at 17, of an automobile, whereby said mirror may be controllably adjusted at will.

In the specific example illustrated, the main body member, indicated generally at 10, also includes a plurality of forwardly and inwardly projecting engaging elements or retaining fingers 18 spaced around the edges of the main body member 10 and adapted to removably receive and hold a plurality of superimposed substantially rectangular elements, such as generally indicated at 19 in FIG. 1, and which, in the specific example illustrated, include a light attenuating mirror shield 20, multi-sheet memo pad 21, and, at the front, a graphic safe-driving pictorial display member 22, which, in the specific example illustrated, bears the pictorial representation 23 of a motorcycle officer thereon and suitable safe-driving slogans, as indicated at 24, for the purpose of constantly reminding a driver of the automobile, whenever he looks at the rear vision mirror 13, of the necessity for driving safely, lawfully, courteously, and within the speed limit, thus tending to greatly minimize accidents.

Figure 3:
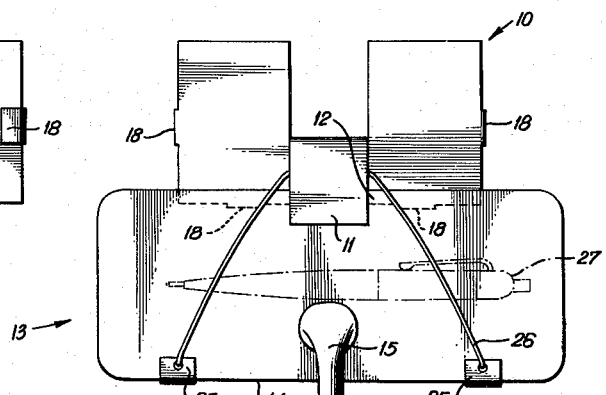
FIG. 3 is a rear elevational view of the device of the present invention in mounted relationship with respect to the automobile rear vision mirror shown in FIG. 1 with all of the plurality of superimposed substantially rectangular elements adapted to be carried thereby removed from the plurality of forwardly projecting engaging elements for the purpose of drawing clarity and simplicity.
Figure 4:
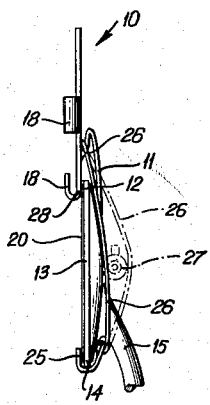
FIG. 4 is a left end elevational view of FIG. 3.
Figure 5:
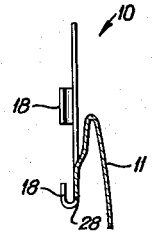
FIG. 5 is a sectional view taken in the direction of the arrows 5—5 of FIG. 2.

Also the specific embodiment of the invention includes two auxiliary hooks 25 interconnected by an elastic longitudinal tensile member 26 adapted to be centrally engaged between the hook means 11 and adjacent portions of the main body member 10, with each of said auxiliary hooks 25 being adapted to be symmetrically spacedly engaged with the opposite or bottom edge 14 of the automobile rear vision mirror 13, whereby to effectively resiliently mount the main body member 10 above the mirror 13 in the manner best shown in FIGS. 1, 3, and 4. It should also be noted that, in the preferred form of the invention illustrated in FIGS. 1–5, the elastic tensile member 26 and adjacent portions of the back surface of the mirror 13 act to effectively provide retaining means for resiliently removably mounting and retaining a writing instrument, such as the mechanical pencil indicated in dotted lines at 27, in a manner such that it can be quickly and easily removed when desired for use in writing on the memo pad 21, which can also be quickly and easily removed from the engaging elements 18, when desired.

It should be clearly noted that whenever an automobile following the driver of the vehicle carrying the mirror 13 and the device of the present invention has lights which are on the "high beam" or which are too bright, the very bright reflection from the surface of the mirror 13 may be substantially attenuated to minimize glare by removing the light attenuating glare shield 20 from the engaging elements 18 (shown in FIG. 1) and by repositioning said light attenuating shield 20 in front of the surface of the mirror 13, as best shown in FIG. 4, by sliding the top edge of it between the lower overlapping edge 28 at the bottom of the main body member 10 and the adjacent top edge 12 of the mirror 13, and by sliding the bottom edge of said light attenuating shield 20 between the bottom edge 14 of the mirror 13 and the front ends of the auxiliary hooks 25, thus very effectively but removably mounting the light attenuating shield 20 in front of the mirror 13 in the manner shown in FIG. 4 until such time as the driver of the vehicle feels that its use is no longer necessary, after which it is normally removed and replaced behind the memo pad 21 in mounted engagement with respect to the projecting elements 18 (best shown in FIG. 1).

Figure 6:
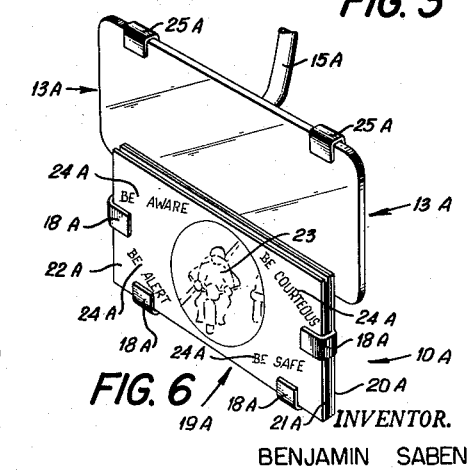
FIG. 6 is a perspective view generally similar to FIG. 1, but showing a slightly modified form of the device adapted to removably mount the main body member below the conventional automobile rear vision mirror rather than above same, as in the first form of the invention illustrated in FIGS. 1–5.
Figure 7:
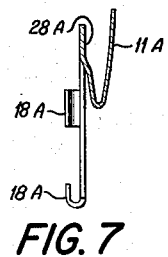
FIG. 7 is a central vertical sectional view generally similar to FIG. 5, but of the modified form of main body member shown in FIG. 6.

FIGS. 6 and 7 illustrate a slight modification of the invention wherein the main body member 10A is adapted to be positioned below the mirror 13A in the manner best shown in FIG. 6. Since this modification is so similar to the first form of the invention, similar parts will be indicated by similar reference numerals followed by the letter "A." It is unnecessary and redundant to describe this modification in detail since it merely comprises an effective reversal of certain parts of the first form of the invention, already described in detail, for the purpose of allowing the main body member 10A to be mounted below the mirror 13A rather than above same. This is made necessary by reason of the mounting of the mirror 13A by the member 15A, which is adapted to be connected to a portion of the automobile located above the mirror 13A rather than below the mirror 13, as in the first form of the invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. An attachment bracket and holder adapted to be removably attached with respect to an automobile rear vision mirror, comprising: a flat thin-sheet main body member of substantially rectangular configuration provided with a central portion displaced from the plane of the remainder of the main body member and providing, with the adjacent portion of the main body member, a mirror edge-engageable hook means, said main body member including a plurality of forwardly projecting engaging elements spaced around the edges thereof adapted to removably receive and hold a plurality of laterally superimposed substantially rectangular elements including, at the front, a graphic safe-driving pictorial display member positioned in a visibly observable manner bearing the pictorial representation of a motorcycle officer thereon; and two auxiliary hooks interconnected by an elastic longitudinal tensile member adapted to be centrally engaged between said mirror edge-engageable hook means and adjacent portions of said main body member, with each of said auxiliary hooks being adapted to be symmetrically spacedly engaged with the opposite edge of an automobile rear vision mirror from the edge thereof centrally engaged by said mirror edge-engageable hook means, whereby to effectively and resiliently mount the main body member closely vertically adjacent to the mirror and additionally providing between the back surface of the automobile rear vision mirror and adjacent portions of said elastic longitudinal tensile member retaining means for resiliently removably mounting and retaining a writing instrument.

2. A device of the character defined in claim 1, wherein said main body portion has a horizontal edge adapted to overlap the vertically adjacent edge of the automobile rear vision mirror when said mirror edge-engageable hook means is engaged with said edge, and adapted to provide, together with the oppositely positioned hooks, a shield-holding means for removably holding and positioning in front of the automobile rear vision mirror said light attenuating shield.

References Cited in the file of this patent

UNITED STATES PATENTS

| | | |
|---|---|---|
| 1,974,661 | Singer | Sept. 25, 1934 |
| 2,048,105 | Cobbs | July 21, 1936 |
| 2,181,324 | Glover | Nov. 28, 1939 |
| 2,206,522 | Varon | July 2, 1940 |
| 2,368,991 | Kopp | Feb. 6, 1945 |
| 2,431,108 | Carleton | Nov. 18, 1947 |